United States Patent
Ogilvie et al.

(10) Patent No.: US 9,811,796 B2
(45) Date of Patent: Nov. 7, 2017

(54) METHOD FOR DELIVERING A SHIPMENT BY AN UNMANNED TRANSPORT DEVICE

(71) Applicant: Deutsche Post AG, Bonn (DE)

(72) Inventors: Thomas Ogilvie, Bonn (DE); Matthäus Pruski, Troisdorf (DE); Ramin Benz, Bonn (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 15/303,352

(22) PCT Filed: Apr. 1, 2015

(86) PCT No.: PCT/EP2015/057152
§ 371 (c)(1),
(2) Date: Oct. 11, 2016

(87) PCT Pub. No.: WO2015/155087
PCT Pub. Date: Oct. 15, 2015

(65) Prior Publication Data
US 2017/0039510 A1   Feb. 9, 2017

(30) Foreign Application Priority Data
Apr. 11, 2014 (DE) .................. 10 2014 105 196

(51) Int. Cl.
*B64C 39/02* (2006.01)
*G06Q 10/08* (2012.01)
(Continued)

(52) U.S. Cl.
CPC .......... *G06Q 10/083* (2013.01); *A47G 29/14* (2013.01); *A47G 29/141* (2013.01);
(Continued)

(58) Field of Classification Search
None
See application file for complete search history.

(56) References Cited

U.S. PATENT DOCUMENTS 6,300,873 B1   10/2001   Kucharczyk et al.
6,853,875 B1*  2/2005   Moritz ................ B65D 88/121
                                                        700/213
(Continued)

FOREIGN PATENT DOCUMENTS

DE  102007003458 A1  7/2008
WO  WO 2007/065649 A2  6/2007
(Continued)

OTHER PUBLICATIONS

International Search Report from related PCT/EP2015/057152 dated May 15, 2015.
(Continued)

*Primary Examiner* — Jonathan M Dager
(74) *Attorney, Agent, or Firm* — Woodard, Emhardt, Moriarty, McNett & Henry LLP

(57) ABSTRACT

The invention relates to a method for delivering a shipment by an unmanned transport device to a receiving container for said shipment, the method comprising the following and additional steps: moving the unmanned transport device into a destination area associated with the receiving container, on the basis of geographical co-ordinates; once the unmanned transport device has reached the destination area, pairing of the transport device with the receiving container and exchanging electronic authorization information between the receiving container and the unmanned transport device.

19 Claims, 2 Drawing Sheets

(51) Int. Cl.
*A47G 29/14* (2006.01)
*G07F 17/12* (2006.01)
*G06Q 50/28* (2012.01)
*B64F 1/04* (2006.01)
*B65G 67/00* (2006.01)
*B60L 11/18* (2006.01)
*B64D 1/22* (2006.01)
*B64D 45/08* (2006.01)

(52) U.S. Cl.
CPC ........ *B60L 11/1809* (2013.01); *B64C 39/024* (2013.01); *B64D 1/22* (2013.01); *B64D 45/08* (2013.01); *B64F 1/04* (2013.01); *B65G 67/00* (2013.01); *G06Q 50/28* (2013.01); *G07F 17/12* (2013.01); *A47G 2029/145* (2013.01); *A47G 2029/149* (2013.01); *B64C 2201/042* (2013.01); *B64C 2201/128* (2013.01)

(56) References Cited

U.S. PATENT DOCUMENTS

| | | | |
|---|---|---|---|
| 7,158,941 B1 | 1/2007 | Thompson | |
| 7,162,330 B2* | 1/2007 | Mayer | A47G 29/141 700/213 |
| 8,152,092 B2 | 4/2012 | Zulkowski | |
| 8,590,828 B2* | 11/2013 | Marcus | B64C 29/0058 244/1 R |
| 9,044,543 B2* | 6/2015 | Levien | G05D 1/00 |
| 9,146,557 B1* | 9/2015 | Ahmed | G05D 1/101 |
| 9,195,950 B2* | 11/2015 | Schenken | G06Q 10/02 |
| 9,305,280 B1* | 4/2016 | Berg | G06Q 10/083 |
| 9,459,620 B1* | 10/2016 | Schaffalitzky | G05D 1/0016 |
| 9,508,264 B2* | 11/2016 | Chan | G08G 5/0043 |
| 9,524,648 B1* | 12/2016 | Gopalakrishnan | B64C 39/00 |
| 9,527,605 B1* | 12/2016 | Gentry | B64F 1/12 |
| 9,540,121 B2* | 1/2017 | Byers | B64C 39/024 |
| 9,567,081 B1* | 2/2017 | Beckman | B64D 1/12 |
| 9,567,168 B1* | 2/2017 | Tibbens | B65G 63/002 |
| 9,625,909 B2* | 4/2017 | Hu | G08G 5/0069 |
| 9,645,581 B1* | 5/2017 | Yang | G05D 1/101 |
| 2003/0079129 A1* | 4/2003 | Lindsay | A47G 29/141 713/176 |
| 2004/0164847 A1* | 8/2004 | Hale | A47G 29/141 340/5.73 |
| 2005/0006525 A1* | 1/2005 | Byers | B64C 1/061 244/118.1 |
| 2006/0011721 A1* | 1/2006 | Olsen, III | G06Q 10/06 235/385 |
| 2008/0004995 A1 | 1/2008 | Klingenberg et al. | |
| 2008/0252417 A1* | 10/2008 | Thomas | B66C 13/46 340/10.1 |
| 2010/0012769 A1* | 1/2010 | Alber | B64C 27/10 244/17.23 |
| 2010/0131121 A1* | 5/2010 | Gerlock | G08G 5/0013 701/2 |
| 2011/0017863 A1* | 1/2011 | Goossen | F41G 7/303 244/3.14 |
| 2011/0084162 A1* | 4/2011 | Goossen | B64C 39/024 244/12.1 |
| 2012/0143482 A1* | 6/2012 | Goossen | G08G 5/0034 701/120 |
| 2013/0240673 A1* | 9/2013 | Schlosser | G05D 1/101 244/137.1 |
| 2014/0032034 A1* | 1/2014 | Raptopoulos | G08G 5/0069 701/25 |
| 2014/0316616 A1* | 10/2014 | Kugelmass | G05D 1/101 701/8 |
| 2015/0120094 A1* | 4/2015 | Kimchi | B64C 39/024 701/3 |
| 2015/0203213 A1* | 7/2015 | Levien | G01C 21/00 701/486 |
| 2015/0317596 A1* | 11/2015 | Hejazi | G06Q 50/28 705/330 |
| 2015/0336671 A1* | 11/2015 | Winn | B64C 39/024 701/3 |
| 2015/0370251 A1* | 12/2015 | Siegel | G05D 1/0027 701/2 |
| 2015/0379796 A1* | 12/2015 | Glasgow | G09C 1/00 340/5.51 |
| 2016/0033966 A1* | 2/2016 | Farris | G01C 21/00 701/15 |
| 2016/0068264 A1* | 3/2016 | Ganesh | G08G 5/0069 701/2 |
| 2016/0090248 A1* | 3/2016 | Worsley | B65G 67/08 414/398 |
| 2016/0159496 A1* | 6/2016 | O'Toole | B64F 1/32 244/110 E |
| 2016/0314429 A1* | 10/2016 | Gillen | G01S 19/13 |
| 2017/0038780 A1* | 2/2017 | Fandetti | G05D 1/104 |
| 2017/0041451 A1* | 2/2017 | Wilkinson | H04W 4/027 |
| 2017/0090484 A1* | 3/2017 | Obaidi | G05D 1/104 |
| 2017/0110017 A1* | 4/2017 | Kimchi | G08G 5/0069 |
| 2017/0129603 A1* | 5/2017 | Raptopoulos | B64C 39/024 |

FOREIGN PATENT DOCUMENTS

| | | |
|---|---|---|
| WO | WO 2008/085547 A2 | 7/2008 |
| WO | WO 2013/095297 A1 | 6/2013 |
| WO | WO 2014/080389 A2 | 5/2014 |

OTHER PUBLICATIONS

Machine Translation of DE10200703458A1 by Lexis Nexis Total Patent on Oct. 7, 2016.
Suzuki, et al; Automatic Battery Replacement System for UAVs: Analysis and Design; J Intell Robot Syst.; Sep. 9, 2011.
Written Opinion Opinion received in related PCT/EP2015/057152 dated May 15, 2015.

* cited by examiner

METHOD FOR DELIVERING A SHIPMENT BY AN UNMANNED TRANSPORT DEVICE

BACKGROUND

The invention relates to a method for delivering a shipment by an unmanned transport device to a receiving container for said shipment, the method comprising the step of moving the unmanned transport device towards the receiving container on the basis of geographical co-ordinates. The invention additionally relates to the unmanned transport device and also the receiving container, which are each designed to carry out the method.

As a result of increasing freight traffic, such as general cargo and grouped cargo shipping via truck transports or container transports by sea freight or air freight and the transport of parcels with use for example of e-commerce as well as online mail-order services, the number of goods in transit and in particular of parcel shipments has significantly increased. Whereas ordering can be done independently of conventional shop opening hours, the order must still be delivered as a shipment to the customer by means of conventional delivery procedures, for example by postmen or, in the case of parcel shipments, by motorised delivery vehicles. Here, an attempt to deliver the shipment to the customer is generally made just once per day. If the customer is not home at the time of attempted delivery, for example because the customer, as an employed individual, is at work, either an attempt is made to deliver the shipment another time, or the shipment is stored at a branch of the delivery company for collection by the customer.

Picking up the shipment stored in this way at the branch of the delivery company, however, frequently poses a new challenge to the customer, since the shipment generally has to be picked up within the opening times of the branch, during which the customer is at work. Alternatively, it is indeed possible to have the shipment delivered to collection points, such as automatic parcel pick-up machines, such as DHL Packstations or Amazon Lockers. However, these are not located in the direct vicinity of the home address of the addressee, and therefore are not located in the immediate area of disposition of the addressee and require the addressee to make a dedicated journey in order to receive the shipment.

There are also solutions that offer shipments to be delivered to a "safe place" on the addressee's property, as offered for example in Germany by DHL, or to be delivered to a designated individual (not the addressee), for example a neighbour. The delivery types, however, are characterised in that protection of the delivered goods, i.e. the shipment, for example against the weather or theft when left outside cannot be fully ensured, and if the designated individual is not at home either, the shipment cannot be successfully delivered.

To summarise, this means that although the ordering of a product through the Internet is extremely flexible, the delivery of the product as a parcel shipment to the customer is still characterised by methods that cannot ensure that the shipment can always be provided directly at the intended delivery location without access risks, and therefore new methods for prompt, more flexible delivery of shipments are desired.

SUMMARY

On this basis, one object of the present invention is to specify a method by means of which a shipment can be supplied in a flexible and prompt manner to the customer who ordered the shipment, at the intended delivery location without the addressee having to be present. A further object of the invention is to provide a corresponding means for delivering the shipment to the customer regardless of shop opening hours and/or delivery manpower in the case of direct shipment delivery. Lastly, a further object of the invention is to provide a further means by which the customer can access the shipment delivered in this way.

The object is achieved by the features in the independent claims. Advantageous embodiments are specified in the dependent claims.

The object is therefore achieved by a method for delivering a shipment by an unmanned transport device to a receiving container for said shipment, the method comprising the following steps:

moving the unmanned transport device into a destination area associated with the receiving container, on the basis of geographical co-ordinates, once the unmanned transport device has reached the destination area, pairing of the transport device with the receiving container, exchanging electronic authorisation information between the receiving container and the unmanned transport device, checking of the authorisation information by the receiving container in respect of authorisation, if authorisation exists, activating a transfer device for the shipment by the receiving container, and transferring the shipment from the unmanned transport device to the transfer device or from the transfer device to the unmanned transport device by the unmanned transport device, by the transfer device and/or by the receiving container, and also in particular moving the unmanned transport device away from the receiving container, and/or deactivating the transfer device.

In order to provide flexible delivery of a shipment to a customer who ordered the shipment or to an addressee of the shipment, it is proposed in accordance with the invention to deliver the shipment by an unmanned transport device, that is to say for example to transport the shipment from a sender, a logistics service provider, a delivery device, or a distribution point to the receiving container, or in the opposite direction, by means of the unmanned transport device. In principle, the shipment can be embodied arbitrarily, for example as a mail item, as a parcel, as a recorded mail item, as a letter, or as another transportable item. The proposed steps are preferably carried out in the specified order, however it is also possible for the proposed steps to be performed in a different order. It is also possible that the method comprises just some of the steps, for example the method can be carried out without the last step or without the two penultimate steps.

The unmanned transport device is preferably embodied as a flying machine, as an unmanned, uninhabited or unpiloted aerial vehicle (UAV for short), as a parcelcopter, as a drone, as a vehicle, i.e. as a self-steering vehicle, and/or as a floating object. Possible embodiments of the unmanned aerial vehicle or UAV can be helicopters, multicopters, for example quadcopters, or tiltwing aircraft, to list just a few possibilities. Where reference is made to a flying machine or drone within the scope of the invention, all possible embodiments and also UAVs, etc., as specified above, are thus also intended. The unmanned transport device more preferably has mechanical and/or IT properties, referred to hereinafter as "intelligence", which make the unmanned transport device capable of carrying out the method. For this purpose, the "intelligence" is preferably designed on the one hand to ensure automatic behaviour and/or on the other hand autonomous behaviour of the transport device, and also of the receiving container, in order to carry out the proposed method. The intelligence can be embodied as a microprocessor, as a control device and/or memory-programmable controller, preferably embodied in each case with a corresponding software program for carrying out the method steps and designed for wired and/or wireless communication for example with the receiving container via communication devices. The transport device can also have sensors which enable the optical, acoustic, olfactory and/or data signal-based identification and interpretation of environmental signals and/or can have mechanical components which contain the components necessary for autonomous movement in space towards or away from the receiving container and for the transfer and/or takeover of the shipment.

A maximum dimensioning, design and/or weight of the shipment to be delivered can be defined in accordance with the embodiment of the transport device. In this respect, it may be that a self-steering and self-driving vehicle can transport shipments having a much heavier weight compared to an unmanned flying object, for example. The receiving container is preferably associated with the addressee of the shipment, by way of example is arranged in the front garden or on the roof of the addressee's house. A single receiving container can also be associated with a number of addressees, for example all individuals living within the same apartment building.

In an exemplary embodiment an unmanned transport device embodied as a drone can fly to the receiving container arranged in this way or, in the case of a driving autonomous transport device, can drive to said receiving container, for example by moving into the destination area and preferably approaching the receiving container, and can then land on or come to a stop at the receiving container so that the shipment can be transferred from the drone to the receiving container. The addressee of the shipment can then, as is also the case with a conventional letterbox, remove the shipment from the receiving container, said shipment having been delivered to the area of disposition of the addressee.

Since the transport device is unmanned, the method can be carried out independently of any shop opening hours, without step-by-step involvement and/or management by operating forces. This means that, due to the method proposed in accordance with the invention, a possibility is created to transport or pick up shipments in an extremely flexible way, primarily at any time of day or night, to/from the receiving container by the unmanned transport device. In other words, the method proposed in accordance with the invention satisfies a long-standing need to deliver to the addressee, in the form of a shipment, goods ordered within the scope of e-commerce and online mail ordering or other logistical contexts in an automated and prompt manner once the order has been placed, or to pick up goods from the sender of the shipment, by means of the unmanned transport device.

The proposed method is preferably provided as a computer-implemented method and is characterised by an automatic execution of the proposed steps. A central server device can thus be provided, which is initially and/or permanently connected to the unmanned transport device and the receiving container for communication therewith. The unmanned transport device can receive, from the central server device, geographical co-ordinates, for example degree of longitude, degree of latitude and absolute height, of the receiving container to be reached so that the unmanned transport device, embodied as a drone, can then fly or drive to the destination area associated with the receiving container, i.e. can move in the direction of the destination area. The transport device can also be provided with further information, such as 3-D visualisations of the surroundings in the destination area and/or specific information relating to the control logic or the receiving container, by means of which information the transport device is able to move in the direction of the receiving container and/or approach the receiving container. In a particularly advantageous embodiment of the invention the transport device, as it approaches the receiving container, is able to record and store relevant ambient information and to compare this with ambient information recorded in the past and potentially update said information, and is also able to feed this updated ambient information back to the central control unit.

The unmanned transport device preferably has means for detecting the current position and for navigation, for example a GPS, Glonass, Galileo and/or Compass receiver for position determination and navigation. The destination area preferably comprises a circular or angular region having a diameter 100 m, ≤50 m, ≤20 m, ≤10 m, ≤5 m and/or ≤1 m. The geographical extent of the destination area is particularly preferably defined by the accuracy of the current geographical position detectable by the unmanned transport device. By way of example, the accuracy of the position determination is approximately 15 m horizontally in the case of GPS. However, if the position determination of the unmanned transport device is implemented via a comparatively less accurate means, for example by GSM, UMTS or LTE, a much less accurate position determination and then also a geographically larger destination area accordingly should be anticipated. In any case, provision is made in accordance with the proposed invention that, in the case of a drone, as a result of the step of moving the unmanned transport device into a destination area associated with the receiving container, on the basis of geographical co-ordinates, a flying of the drone towards the receiving container is to be understood to mean flying until the destination area has been reached, i.e. the drone is within the destination area. The geographical position of the destination area is determined by the geographical co-ordinates. The transport device preferably has a navigation device that navigates into the destination area by comparison of the current position and/or road map or environment map information with the geographical co-ordinates aimed for by the transport device.

Once the unmanned transport device has reached the destination area, i.e. has entered the destination area, the transport device is paired with the receiving container. This can be implemented for example by detection of a locating signal, which is emitted by the receiving container. The step of pairing of the transport device with the receiving container preferably also comprises a detection of the locating signal emitted by the receiving container by the unmanned transport device, wherein the method also comprises the further step of the unmanned transport device approaching the receiving container on the basis of the locating signal. The locating signal can be a directed, electromagnetic wave, preferably of the "tractor beam" type. The transport device preferably has a means for detecting the locating signal, for example via a ground-level aid, by means of which the position and/or location of the transport device can be determined, and is also preferably embodied in such a way that, once the locating signal has been detected, the transport device can continue to approach the receiving container in a manner accurate to within a centimeter, preferably until it touches the receiving container. The transport device and/or the receiving container can also have an optical means, by means of which the transport device can approach the receiving container with targeted precision, so that for example a drone can land with the support of images. An optical means of this type can comprise a QR code, which is provided on the transport device and/or on the receiving container. The optical means can be detected by being photographed, filmed and/or scanned, for example by means of a camera which is provided on the transport device and/or on the receiving container. In addition, the transport device can be paired with the receiving container by ultrasound and/or radar, i.e. by ultrasound sensors and/or radar sensors, by means of which a height determination, distance measurement and/or floor contact measurement of the transport device in relation to the receiving container is possible. In a further preferred embodiment information can be exchanged between the transport means and receiving container as a result of the pairing, for example as a result of the tractor beam. The receiving container can in this way for example communicate to the transport means that the receiving container is full, delivery of the shipment is not possible and/or a return is possible.

Alternatively, the transport device can initially emit an initiation signal, which prompts the receiving container to in turn transmit the locating signal, which has the advantage that permanent emission of the locating signal by the receiving container is avoided as a result. Besides this self-sufficient interaction between transport device and receiving container, it is also conceivable that both devices transmit their signals to a third control unit, which then co-ordinates the bringing together of the transport device and receiving container. Besides purely data signal-based pairing options, it is also possible for the transport device to identify the receiving container on the basis of optical, acoustic and/or olfactory attributes by means of sensors. As already mentioned, the accuracy of satellite-supported systems for position determination is characterised by an inaccuracy of approximately 15 m or sometimes less. This means that the accuracy of the position determination is insufficient for a drone, as unmanned transport device, to land with targeted precision on the receiving container, which for example, embodied as a parcel box, has a footprint of 50×50 cm, or, in the case of road-based travel, to drive up to the receiving container until it touches this or to drive up to the receiving container to a distance shorter than the inaccuracy of the position determination. So that the drone can still land or touch down on the receiving container in a manner "accurate to within a centimeter", a pairing process as described above takes place between the receiving container and transport device and enables the transfer device of the receiving container to be approached in an exact manner.

In other words, provision is made for the unmanned transport device to firstly move independently and preferably also in a self-steering manner in the direction of the receiving container until within the destination area. In the destination area, the transport device is generally still distanced from the receiving container by a few meters or centimeters, for example is distanced by 15 m, depending on the accuracy of the geographical co-ordinates and/or the determined current geographical position. As a result of the pairing of transport device and receiving container, referred to hereinafter as a "locating process", the transport device is able to further reduce the distance between transport device and receiving container, for example until the drone lands on the receiving container in a very precise manner. The inaccuracy of the position determination based on the satellite-assisted position data can thus be compensated for by the locating process.

In order to transfer the shipment from the unmanned transport device to the receiving container, or vice versa, a transfer device is preferably provided by the receiving container. The transfer device can be embodied by way of example as an opening with a storage compartment within the receiving container, such that the activation of the transfer device for the shipment can comprise the opening of the opening so that the transport device can transfer the shipment through the opening and into the storage compartment of the receiving container. Similarly, the deactivation of the transfer device can comprise the closing of the opening. Alternatively, an element of the receiving container can also be anchored statically to the ground or to a wall, and another part of the receiving container can be removed by the transport device from the receiving container on the basis of authorisations or can be fitted to the static part of the receiving container. Here, it is advantageous when a static and flexible part of the receiving container are in this case connected to one another such that the unauthorised removal of the flexible part of the receiving container from the static part of the receiving container is not possible, but at the same time the flexible part of the receiving container can be removed from or supplied to the flexible part of the receiving container with corresponding authorisation of the transport device.

In accordance with the method proposed in accordance with the invention, however, the transfer device is activated or provided, for example the opening is opened, only when authorisation exists. The authorisation can comprise, for example, a code, i.e. a code formed of numbers, letters, or a combination of numbers and letters, or a mechanical, magnetic, electromagnetic and/or electronic key, which is exchanged between the receiving container and the unmanned transport device. By way of example, the unmanned transport device can thus have a means for emitting the authorisation information, and the receiving container can thus have means for receiving the authorisation information. The authorisation information can also be an identification code of the transport device encrypted by a key. By way of example, the receiving container then has the same or a corresponding key, or can generate this, in order to decrypt the encrypted identification code used in order to prove authorisation with respect to the receiving container and can then check whether the decrypted identification code matches the identification code of the receiving container. In an alternative variant it is conceivable for both the transport device and the receiving container to provide their authorisation information via a data network to a third inspection body, which approves or denies the authorisation for access to the transfer device on the basis of the geographical co-ordinates of the transport device and receiving container relative to one another and on the basis of the comparison of the respective authorisation information, for example when the transport device and receiving container are not sufficiently close geographically.

Furthermore, the authorisation information, or the key, can be associated with the corresponding transport device, the corresponding shipment and/or the corresponding receiving container. Provision can also be made for each individual transport device to be assigned a corresponding key, which provides authorisation universally for various receiving containers. In addition, the transport device and/or the receiving container can have communication means, for example a means for wireless communication, via which the receiving container receives the authorisation information so as to exchange this with the unmanned transport device or so as to transmit authorisation information received by the transport device to the server device for the purpose of checking the authorisation information. In addition, it is also possible for the authorisation information to exist in optical form and for an optical comparison to be performed in this respect.

If it has now been determined that the transport device is authorised, the receiving container activates the transfer device for the shipment so that the shipment can be transferred between the transport device and receiving container by means of the transfer device. The receiving container can be designed to receive a number of shipments by the transport device, for example within the scope of a single transfer or within the scope of a number of successive transfers, possibly by different transport devices. The shipments received in this way can then preferably be removed from the receiving container by the addressee of the shipment or customer who ordered the shipment. On the other hand, the receiving container is preferably embodied in such a way that, if a shipment is returned, the customer can deposit the shipment in the receiving container so that the shipment can be transferred by the receiving container to the transport device, in particular by means of the transfer device. Here, it is either possible for the shipment to be exchanged between the transport device and receiving container without being repackaged further, or, as described above, the transport device can feed or remove flexible parts to/from the receiving container, in which the shipment is located.

Provision can also be made for the transport device to transfer a first shipment to the transfer device and for a second shipment to be transferred from the transfer device to the unmanned transport device. Once the transfer of the shipment or shipments is complete, the unmanned transport device moves away from the receiving container, which in the case of a drone for example means that the transport device flies away from the receiving container.

As the transport device moves into the destination area and/or as the transport device approaches, A check is preferably performed by the transport device and/or the receiving container, for example by a radar, in order to determine whether people or individuals are present in a geographical radius of less than 20 m, 10 m, 5 m or 2 m around the receiving container. Only if it is determined that there are no people or individuals within the radius does the transport device receive approval to move into the destination area or to approach the receiving container, for example in the case of an unmanned flying object as transport device an approval to land on the receiving container. The transport device and/or the receiving container are further preferably embodied to generate an acoustic signal as the transport device moves into the destination area and/or as the transport device approaches the receiving container, which signal warns individuals located in the vicinity that the unmanned transport device will shortly arrive at the receiving container. The acoustic signal can be a periodic beep and/or a voice message, for example "warning—object approaching". A signal can also be generated as the transport device moves away from the receiving container.

As a result, a fully automated process sequence is specified by the method proposed in accordance with the invention, by means of which process sequence a shipment can be delivered by an unmanned transport device to a receiving container or can be picked up from the receiving container so that the shipment reaches the area of disposition of the addressee of the shipment, or a sender can transfer a shipment from the sender's area of disposition in the form of the receiving container to the transport device, without the need for any sort of human interaction for the delivery or pickup of the shipment. It is thus possible that goods ordered by a customer are delivered as a shipment to the addressee and/or are picked up from a sender immediately following the placement of the order.

In accordance with a preferred development the method comprises the step of informing the receiving container that the unmanned transport device has moved into the destination area and, in response to the information, initiating the pairing between the transport device and receiving container. The way in which the informing step can be carried out has already been explained above with reference to examples. It is thus preferred in particular for the receiving container to be informed by a signal emitted from the transport device, for example by a Bluetooth, NFC, GSM and/or WLAN signal. The central server device, which is designed for communication at least with the receiving container, can also inform the receiving container that the unmanned transport device is heading for the receiving container or the destination area.

In addition, The receiving container can be informed not only of an approaching unmanned transport device, but can also receive information as to whether a shipment is to be transferred to the receiving container or is to be picked up from the receiving container by the unmanned transport device as well as further attributes associated with this shipment, for example the shipment identification number thereof or information relating to specific supply and/or removal preparations, for example in the case of fragile goods. The receiving container can also receive information relating to the shipment, for example size, weight, sender information and receiver information, such as name, etc. Lastly, the authorisation information can also be sent to the receiving container, said information being used subsequently to activate the transfer device. The authorisation information can also be checked by the receiving container in order to ensure that the locating process is initiated only if authorisation exists.

The locating process is preferably initiated for a limited period of time or until the shipment has been transferred between the transport device and receiving container. The locating signal is then switched off again, preferably by the receiving container. As a result, a sort of "wake-up function" is provided for the receiving container as a result of the proposed embodiment, such that battery-powered operation of the receiving container is thus also possible by way of example. Embodied in this way, for example by the provision of a photovoltaic element for the power supply of the receiving container, the receiving container can be installed self-sufficiently and therefore independently of any stationary power supply.

In principle, the unmanned transport device can approach the receiving container in an arbitrary manner, provided the shipment can be transferred subsequently between the transport device and receiving container. For this purpose, if the unmanned transport device is embodied as a self-driving vehicle or as a floating object, it can be sufficient, for transfer of the shipment, for the transport device to approach the receiving container until arranged at a short distance therefrom, i.e. approximately 1 m or 0.5 m. In accordance with a further preferred embodiment the step of the unmanned transport device approaching the receiving container comprises a position-specific connection of the unmanned transport device to the receiving container, referred to hereinafter as "docking". In the case of an embodiment of the unmanned transport device as a drone or as a flying machine, the docking occurs preferably in the form of the landing of the drone on or at the receiving container or the transfer device. Since the approach is embodied as a docking in this preferred development, the shipment can be transferred particularly easily. A physical pairing and/or touching of the transport device and the receiving container and/or the transfer device, or a reduction of the distance between the transport device and receiving container since reaching the destination area more preferably is/are performed as a result of the docking.

The mechanical, magnetic, electromagnetic and/or electronic authorisation information can be embodied arbitrarily in principle, wherein, in accordance with a particularly preferred development however, provision is made for the electronic authorisation information to comprise a Bluetooth, WLAN, GSM, NFC, RFID and/or electronic radio signal. In this context, the receiving container can comprise an authorisation inspection means for checking the authorisation information as well as a control means, by means of which the transfer device can be provided for the shipment when authorisation exists. The authorisation inspection means can be formed for example by a processor, for example by a microprocessor, a DSP, or an FPGA.

The authorisation inspection means can also be stored as computer program instructions in a memory of the processor and can be executed by the processor when the computer program with these instructions runs on the processor. The authorisation information, as already discussed briefly above, can be embodied as a code, i.e. as a code formed of numbers, letters, or a combination of numbers and letters, as a mechanical, magnetic, electromagnetic and/or electronic key, i.e. as a symmetric key or as a public and private key of an asymmetric key pair, in particular of a PKI (public key infrastructure), or can consist thereof. The authorisation information can additionally or alternatively comprise or consist of encrypted information. The authorisation information can thus be associated individually with the corresponding shipment, the transport device, or the receiving container.

In accordance with a further, particularly preferred embodiment the exchange of the electronic authorisation information comprises an emission of the electronic authorisation information by the unmanned transport device to the receiving container. The receiving container in this embodiment preferably receives the authorisation information and compares it in accordance with a further exemplary embodiment with a previously stored or separately obtained key. In accordance with a further preferred embodiment the authorisation information is stored on a portable electronic device on the unmanned transport device, i.e. in particular on an RFID or NFC tag. For an embodiment of this type each electronic device can be assigned different authorisation information, i.e. a different key.

It is also possible for the authorisation information to be generated depending on an identification code of the unmanned transport device, i.e. by a predefined, but secret algorithm. In the case of symmetric encryption, the key or a corresponding key in the case of asymmetric encryption can be generated on the basis of the identification code of the unmanned transport device. It is thus ensured that the authorisation information cannot be used in a falsified manner or as a simple copy with another portable electronic device. It is also possible that the authorisation information is assigned at least to the customer who ordered the shipment or individual picking up the shipment at least temporarily, in particular for the time at which authorisation is proven so that the customer can receive access, by means of the authorisation information, to the shipment transferred to the receiving container. In other words, the authorisation information is used not only so that the unmanned transport device receives access by means of the transfer device to the receiving container in order to transfer the shipment, but so that an individual picking up the shipment or an individual bringing the shipment to the receiving container can also acquire the shipment by means of the authorisation information and thus remove the shipment from the pickup container or deposit a shipment in the pickup container. For this purpose, the authorisation information is transmitted to the individual picking up the shipment or to the customer who ordered the shipment, for example in the form of an e-mail message, as SMS, or in any other electronic way.

It is also possible for the individual picking up the shipment to take the authorisation information from a website and then access the shipment at the receiving container by means of said authorisation information. In the case of the RFID or NFC tags, these may be tags with their own power supply or may be tags that do not have their own power supply, which for example work at 120-135 kHz, 13.56 MHz, or 865-869 MHz. The information transfer can be based for example on capacitive coupling, inductive coupling, or electromagnetic waves. It is thus also possible that the authorisation information is modulated onto a high-frequency signal generated by an RFID or NFC reader, for example in the form of a load modulation. RFID or NFC tags are specified for example in accordance with ISO standards 18000, 11784/11785 and/or the ISO-IEC standard 1443 and 15693.

The authorisation can be checked by way of example in that, as already mentioned in the introduction, authorisation inspection means compare the authorisation information used to prove authorisation with authorisation information stored in a memory of the receiving container. In the case of a match or predefined correspondence between the used and stored authorisation information, the authorisation inspection means can come to the conclusion that authorisation exists. By way of example, the processing can comprise or consist of a decryption, for example when the authorisation information comprises or consists of encrypted information which, after decryption, is compared with the authorisation information stored in the receiving container.

In accordance with a further particularly preferred embodiment the authorisation information has a limited period of validity, for example can no longer be used once a predefined period of time has elapsed, which for example could be a few minutes, hours, days, weeks or months, or can no longer be used beyond a predefined validity date. It can thus be ensured that authorisation information that has been made accessible to an unauthorised third-party automatically loses its validity so that the unauthorised third party does not have unauthorised access to the shipment following expiry of the validity.

There are various possibilities in principle for designing the transfer device. However, in accordance with a particularly preferred embodiment provision is made such that the activation of the transfer device comprises an opening of an opening in a roof or a side wall of the receiving container in order to place and/or collect a shipment in/from the receiving container and/or comprises an extension and/or deployment of a docking device for the unmanned transport device. The transfer device is more preferably embodied as a conveyor belt and/or comprises a conveyor belt for transferring and/or conveying the shipment. In accordance with this embodiment the transfer device can be activated by switching on the conveyor belt, and the transfer device can be deactivated by switching off the conveyor belt. In accordance with a development that is even more preferred, the transfer device is self-mobile, in particular movable. In this case, the transfer device can be activated by moving the transfer device from the receiving container to the transport device, which in the case of an unmanned aerial vehicle has landed for example in the destination area. The transfer device is preferably self-mobile so as to be able to move within the destination area to an unlimited extent and for this purpose for example has a drive and wheels, and can thus move geographically independently of the receiving container, preferably in a self-steering, self-moving and/or autonomous manner. An embodiment of this type is advantageous when the transport device is a vehicle that cannot come into direct, for example touching, in contact with the receiving container. An embodiment is also possible in which an unmanned aerial vehicle as transport device drops the shipment in the destination area, after which the transfer device moves towards the shipment and collects the shipment so as to then transport it to the receiving container. The transfer device can comprise a vacuum means for collecting the shipment and/or can comprise means for charging a rechargeable battery of the transport device.

The receiving container can in principle also be embodied arbitrarily, but preferably has a rectangular housing formed by a roof and at least one side wall. The receiving container furthermore is preferably embodied as a letterbox, parcel box, letter and parcel box and/or as a Packstation (parcel drop-off and pickup station) and for example is arranged in front of or on the house belonging to the addressee of the shipment. The receiving container can also be formed in a number of parts, for example in two parts, wherein a first part is designed for communication with the transport device and a second part, which potentially may be distanced from the first part, is designed to receive the shipment. The receiving container may also not comprise a container or a housing, for example can be embodied as a transmitting and/or receiving device for communication with the transport device. Lastly, a first part of the receiving container can be arranged on a roof of a building, for example as a landing device and/or landing space for the transport device, and a second part, which potentially may be distanced from the first part, for receiving the shipment can be arranged within the building. In this case, the two parts of the receiving container can be connected to one another by a conveyor belt and/or in the form of a chute, as transfer device, for transporting the shipment between the two parts. In the embodiment as a parcel box, devices for receiving the shipment are provided within the receiving container, in particular devices for receiving multiple shipments, for example parcels. A closing and/or actuation device is further preferably provided for the opening or the docking device and enables the opening to be opened or the docking device to be extended and/or deployed depending on the authorisation. When the opening is in the closed state or when the docking device is retracted or undeployed, an unauthorised opening or extension or deployment are prevented by means of a locking device. The opening or docking device is preferably embodied on the one hand in such a way that a shipment can be transferred from the unmanned transport device into an interior of the receiving container through the open an opening and/or a shipment stored in the interior of the receiving container can be transferred to the unmanned transport device through the opened opening, in each case preferably when the unmanned transport device has approached the receiving container, very particularly preferably in the case of a drone when the drone has landed on or at the receiving container.

The shipment can likewise be transferred by means of the docking device, for example when the unmanned transport device is embodied as a self-driving vehicle. For this case it is conceivable that the self-driving vehicle independently approaches the receiving container, for example up to a few centimeters therefrom, so that the docking device can then be extended or deployed towards the self-driving vehicle so that the shipment can then be transferred between the self-driving vehicle and the receiving container. A shipment transferred by means of docking device to the receiving container is more preferably moved into the interior of the receiving container by retracting or withdrawing the docking device and is thus protected against access by unauthorised third parties. In accordance with a further preferred embodiment the receiving container is designed such that the opening and/or closing of the opening or extension or deployment and/or retraction or withdrawal of the docking device can be electronically monitored and also transmitted to a remote server and/or monitoring device.

As already mentioned, the shipment can be transferred from the unmanned transport device to the receiving container or from the receiving container to the unmanned transport device arbitrarily in principle. In accordance with a particularly preferred embodiment however, provision is made such that the transfer of the shipment comprises a lowering of the shipment from the unmanned transport device and/or a lifting of the transfer device and/or the shipment by the receiving container and/or by the transfer device. In accordance with yet a further preferred embodiment the method comprises the step of gripping, hooking and/or suctioning of the shipment by the unmanned transport device and/or the receiving container in order to transfer the shipment. As a result of these embodiments the shipment can be safely transferred between the transport device and receiving container, for example by a lowering of the shipment from the unmanned transport device to the receiving container by means of a lowering device provided on the transport device. In order to lift the shipment, the receiving container by way of example may have a device which lifts the shipment, in the case of an unmanned aerial vehicle as transport device, towards the unmanned aerial vehicle landed on the receiving container so that the drone can then grip the shipment by means of a gripper arm and can hook the shipment on at the unmanned aerial vehicle. Provided the unmanned aerial vehicle now flies away from the receiving container, the shipment transferred to the transport device can be secured by the gripper arm during the flight. The gripper arm can also be part of the receiving container, such that the gripping can be effected by an encasing of the shipment. The shipment can also be transferred in that the shipment is dropped from the transport device to the receiving container, for example from a distance of from 60 to 80 cm between the transport device and receiving container. In this case the transfer device of the receiving container can be embodied as a net for catching the shipment, for example as a retractable catch net.

In accordance with yet a further preferred embodiment the method comprises the step of detecting, documenting, photographing, filming and/or scanning the transfer of the shipment between unmanned transport device and receiving container and/or detecting, documenting, photographing, filming and/or scanning the shipment as said shipment is transferred. As a result of this step it is possible to record in a reproducible manner the fact that the shipment has been transferred and/or to detect possible shipment data applied to the shipment. By means of a communication method, the transfer of the shipment and/or shipment-specific data detected during the transfer of the shipment can be transferred as documentation of the transfer to a remote server device by the transport device and/or by the receiving container. It is also possible, following the transfer of this shipment, that the receiving container displays information relating to the shipment acquired as a result of the transfer, for example the name of the addressee, on a display provided on the receiving container.

It is also possible, for example by the server device, for the transfer of the shipment to be communicated to the addressee by means of the electronic communication method, for example by SMS, e-mail or the like. The addressee then receives information stating that the addressee can remove the shipment from the receiving container. It is also possible, after transfer of the shipment to the transport device, for a sender of a designated shipment to be informed that the receiving container now has space to receive the designated shipment, which, after transfer by the sender to the receiving container by the unmanned transport device, can be delivered for example to a logistics service provider for further distribution.

In accordance with yet a further preferred embodiment the method comprises the step of electronically transmitting a message to the receiving container informing that the unmanned transport device is moving towards the receiving container, and/or electronically transmitting a transfer message following successful transfer of the shipment by the receiving container. The electronic transmission is preferably implemented via a required and/or wireless data network, for example the Internet or a mobile communications network. The receiving container, in accordance with a further embodiment, can have a sleep mode, in which electronic devices of the receiving container are switched off in order to save electrical energy, and an awake mode, in which the receiving container emits the locating signal and/or in which a transfer of the shipment is possible.

By electronically transmitting the message to the receiving container, the receiving container can the switch from the sleep mode into the awake mode, and following successful transfer can be switched back into the sleep mode. In an embodiment of this type the container in sleep mode uses much less energy than in the awake mode, and therefore the operation of the receiving container by means of a single-use battery or a rechargeable battery is conceivable. The transfer message following successful transfer can be published for example on a website so that a sender of the shipment can be made aware that the shipment has reached the area of disposition of the addressee. Once the shipment has been transferred to the transport device, a logistics service provider can also be informed of the future arrival of the transport device at the logistics service provider.

In accordance with a further preferred embodiment the locating signal is embodied as, or the pairing is implemented by, a beam, by an instrument landing system and/or as a horizontal and vertical guide signal. Two beams can also be provided, i.e. in the form of information regarding the route for signalling a landing approach, and in the form of information regarding height for signalling a glide path. A device for detecting the locating signal is preferably provided on the transport device, for example an instrument landing system receiver. The locating signal more preferably comprises a first signal which indicates a lateral deviation to the approaching transport device, and also a second signal which gives vertical guidance to the approaching transport device.

The locating signal is more preferably emitted by an antenna system, wherein two signals can be modulated in amplitude modulation onto a carrier frequency in order to display the lateral deviation, such that a radiation maximum lies along an approach line. A further signal can be emitted via the antenna system, which further signal is likewise created by amplitude modulation, wherein, however, there is no pure carrier component and the radiation maxima lie on either side of the approach line, becoming zero toward the approach line. The difference of the modulation depth can be measured by the approaching transport device and is measured depending on the position of the transport device approaching the receiving container, wherein the approach line is formed as a line along which the difference of the modulation depth is zero.

Similarly, The antenna system can be designed to signal the vertical guide for the approaching transport device. The locating signal more preferably emits in a frequency range of 108.1 MHz to 111.95 MHz and/or 329 MHz to 335 MHz. In any case, the locating signal is preferably formed in such a way that the transport device, which has approached the receiving container to a distance of a few meters therefrom according to the geographical co-ordinates and has thus reached the destination area, can reach the receiving container with just a few centimeters distance or so as to be touching the receiving container, by means of the locating signal. For this purpose, the locating signal is particularly preferably formed as an electromagnetic wave, wherein, however, the locating signal can also comprise an optical signal, for example a laser beam.

In accordance with a further preferred embodiment the method comprises the step of charging a rechargeable battery of the unmanned transport device by the receiving container and/or the transfer device. The rechargeable battery is preferably charged during and/or after the transfer of the shipment. It is also preferred for the unmanned transport device to remain at the receiving container until the rechargeable battery has been charged, in particular until the rechargeable battery has been charged to a level of 50%, 75% or 100% and/or has been charged to such an extent that the unmanned transport device is able to reach the next receiving container and/or fly back to a starting point. Provision can also be made for the unmanned transport device to reside at the receiving container until the transport device receives a new request to transfer a shipment. The rechargeable battery is preferably charged by means of wireless charging technology, in particular by magnetic induction.

The object of the invention is also achieved by an unmanned transport device designed to carry out a method as described above and embodied as an unmanned flying machine, in particular as a drone, as a UAV, i.e. in particular as an unmanned, uninhabited and/or unpiloted aerial vehicle, as a drone, as a parcelcopter, as a helicopter, as a multicopter, as a quadcopter, as a tiltwing aircraft, as a vehicle, or as a floating object. The transport device is more preferably designed for the transport of the shipment, i.e. in particular a shipment with a weight of ≥0.01 kg, ≥0.1 kg, ≥0.2 kg, ≥0.5 kg, ≥1 kg, ≥2 kg, ≥5 kg, ≥10 kg and/or ≥100 kg, or in each case also less than or equal to this weight. The flying machine preferably comprises an automatic control device which stabilises the flying machine during take-off and landing, when hovering, and in the transition to hovering and from hovering to dynamic flight. For this purpose, rotors driven in opposite directions can be provided, which are controlled accordingly in respect of their thrust or in respect of the torque applied via electric motors, such that a stable flight position is provided. The control device, which can comprise a microprocessor and/or a memory-programmable controller, can also be designed for connection to the central server device and/or the receiving container for communication therewith. The flying machine can additionally comprise a number of rotors, and also rigid or flexible wings.

Lastly, the transport device in accordance with a further preferred embodiment comprises a container in which the shipment or a number of shipments can be transported, protected against external influences such as rain. The container further preferably has a container opening, through which the shipment can be introduced into the container. The vehicle or the floating object is preferably embodied similarly, i.e. has a control device by means of which the transport device can be moved independently, without manual interaction, from a starting point to a target point. For this purpose, the control device is preferably embodied in such a way that, after input or transfer of the geographical co-ordinates to the control device, the transport device can independently reach the destination area defined by the geographical co-ordinates. The control system can have a virtual map for this purpose, or can have access to a virtual map stored on the server device. This map can be formed for example as a road map, such that a self-driving vehicle has access to route information so as to reach the destination area with use of the routes from the starting point to the target point.

With regard to the flying machine, the map can also contain information relating to the fact that, for example, a receiving container can only be flown to indirectly because the receiving container is covered by a balcony or the like, i.e. cannot be reached directly by a vertical flight towards the ground following flight in the horizontal direction. For this case, the electronic map may contain information for the control device of the transport device to the effect that, after horizontal flight in the direction of the receiving container, a vertical descent is first necessary so as to then reach the receiving container following a subsequent horizontal flight. Is also preferred that the geographical co-ordinates not only comprise co-ordinates with regard to degree of longitude and degree of latitude of the position of the receiving container, but also information relating to a vertical position of the receiving container at absolute height. The flying machine can then identify, by means of the vertical position, the height to which it must drop from the sky during vertical flight in order to land on the receiving container.

The object of the invention is additionally achieved by a receiving container designed to carry out a method as described above and embodied as a letterbox, parcel box, letter and parcel box and/or Packstation (drop-off and pickup station) for receiving the shipment. The receiving container preferably has a housing, wherein one or more doors can be provided on the housing, through which door(s) an addressee of the shipment or customer who ordered the shipment can access the shipment.

The invention will be explained in greater detail hereinafter on the basis of a preferred embodiment with reference to the accompanying drawings, in which:

DETAILED DESCRIPTION OF THE DRAWINGS

Figure 1:
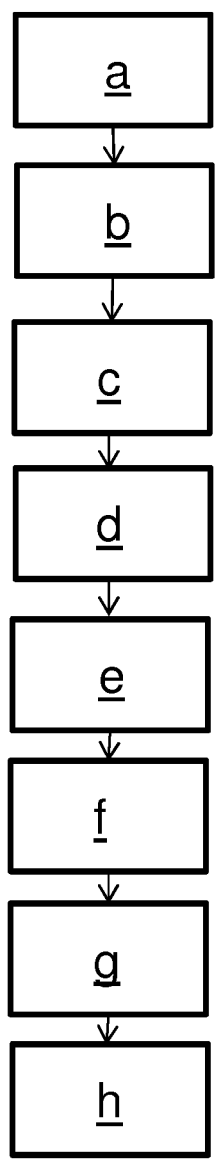
FIG. 1 shows a flow diagram of an exemplary embodiment of the method according to the invention for delivering a shipment by an unmanned transport device.
Figure 2:
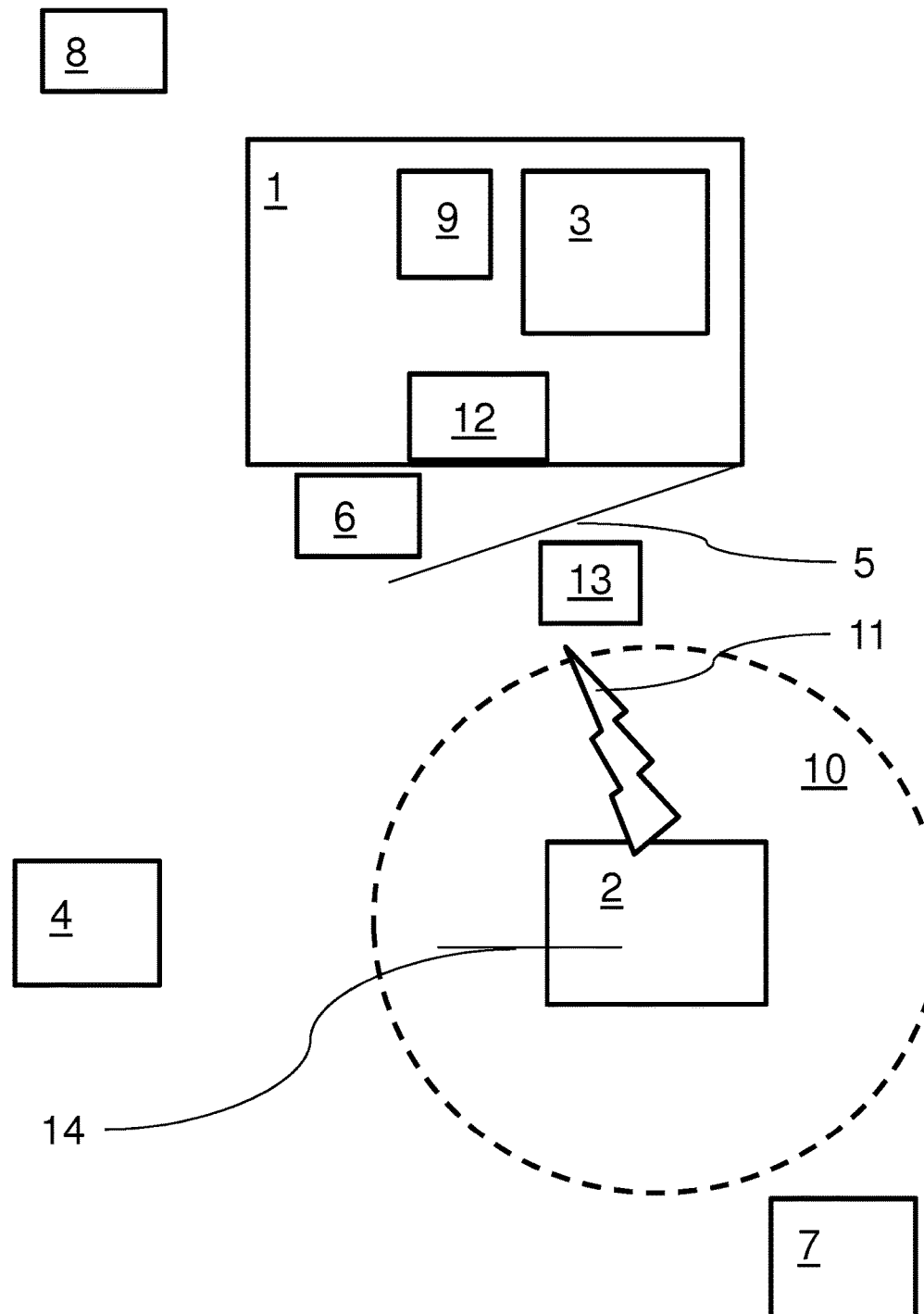
FIG. 2 shows a view of an exemplary embodiment for carrying out the method according to FIG. 1 with transport device and a receiving container for the shipment.

The method according to the invention will be described hereinafter on the basis of the drawing on the basis of a particularly preferred use with a drone as unmanned transport device 1 as a flow diagram in FIG. 1 and also as a schematic view of the unmanned transport device 1 with a receiving container 2.

The drone 1 has a rotor (not shown) and a control device 3, by means of which the flight of the drone 1 from a starting point 4 to the receiving container 2 can be controlled. A gripper arm 5 is provided on the drone 1 by means of which arm a shipment 6 is secured to the drone 1. The shipment 6 has been ordered from a sender by an addressee 7, who is now expecting delivery of the shipment 6 at the receiving container to. For this purpose, the control device 3 of the drone 1 has received geographical co-ordinates of the receiving container 2, for example a degree of longitude and a degree of latitude of the site of installation at the receiving container 2, from a central server device 8.

The drone 1 is embodied as an unmanned transport device 1 in such a way that the control device 3 can move the drone 1 independently, i.e. without further human interaction, towards the receiving container 2. For this purpose, the drone 1 has a GPS receiver 9, by means of which a current geographical position of the drone 1 can be determined. Proceeding from the current position, that is to say initially from the starting point 4, the drone moves in a first step a to a destination area associated with the receiving container 2, on the basis of the geographical co-ordinates.

The destination area 10 is a geographical region formed around the site of installation of the receiving container 2, typically with a circular extent, the size of which is determined by the inaccuracy of the GPS signal obtained by means of the GPS receiver 9. The accuracy of a position determination by means of GPS receiver 9 is typically approximately 15 m or better, and therefore in this case the destination area 10 would be a circle with a diameter of 15 m.

Once the drone 1 has reached the destination area 10, i.e. when the current position determined by means of the GPS receiver 9 matches the geographical co-ordinates, the drone 1 informs the receiving container 2 so that the receiving container 2 can activate a locating signal 11 in response to the information. Alternatively, it may also be that the server device 8 informs the receiving container 2 that the drone 1 is moving in the direction of the destination area 10, so that the receiving container 2 then activates the locating signal 11.

The locating signal 11 is characterised by an electromagnetic wave which allows the drone 1 to locate the receiving container 2 in a manner accurate to within a centimeter and to then land on the receiving container 2 in a manner accurate to within a centimeter. In the case of a footprint of 40×40 cm of the drone and the same footprint of the receiving container 2 formed as a parcel box, it is necessary for the drone 1 to land on the receiving container 2 in a very precise manner or with a target deviation of a few centimeters so as to be able to transfer the shipment 6. In this regard, travel to the receiving container 2 merely on the basis of GPS position data is too imprecise. If, however, the drone 1 has reached the destination area 10, the drone 1 detects the locating signal 11 emitted by the receiving container 2 (step b). The locating signal for this purpose acts as what is known as a "tractor beam", by means of which the drone 1, after reaching the destination area 10, can travel the last few meters to the receiving container 2.

For this purpose, it may be necessary for the drone 1 to first circle back and forth a few meters in the destination area 10 horizontally in the x- and y-direction until a receiver device 12 provided on the drone 1 has detected the locating signal 11 (step b). Once the locating signal 11 has been detected, the drone 1 approaches the receiving container 2 further (step c) and then lands on the receiving container 2.

In parallel to this, step d is performed, i.e. the exchanging of electrical authorisation information 13 between the drone 1 and the receiving container 2. The drone 1 has landing feet (not shown), by means of which the drone 1 can land on the receiving container 2. An electronic key is arranged in the landing feet as authorisation information 13, which is emitted via Bluetooth from the drone 1 to the receiving container 2. The receiving container 2 has also received an electronic key from the server device 8 by means of wireless communication via a mobile communications network, which key is compared in step e to the authorisation information 13 emitted by the drone 1.

If the check of the authorisation information 13 by the receiving container 2 has indicated that the drone 1 is authorised, the receiving container 2 provides a transfer device 14 for the shipment 6 (step f). The transfer device 14 is embodied in the present case as an extendable docking device 14 for the drone 1, i.e. specifically as a platform, on which the drone 1 can land.

Once the drone 1 has landed on the transfer device 14, the shipment 6 can be lowered from the drone 1 onto the transfer device, i.e. can thus be transferred to the transfer device 14 (step g). The transfer can be documented by the receiving container 2, wherein shipment-specific data of the shipment 6 can also be detected. The shipment-specific data can be transmitted by the receiving container 2 to the server device 8 so that the successful transfer of the shipment 6 can thus be documented. The receiving container 2 can also comprise a display device, at which the successful transfer of the shipment can be signalled for the addressee 7.

Since the shipment 6 has now been transferred from the drone 1 to the receiving container 2 in accordance with step g, the drone 1, in the last step of the proposed method, flies away again from the receiving container 2 (step h). The transfer device 14 is then retracted again so that the shipment 6 is conveyed into an interior of the receiving container 2. Via a door (not shown) of the receiving container 2, the addressee 7 can then access the shipment 6 transferred in this way and can collect it from the receiving container 2.

LIST OF REFERENCE SIGNS unmanned transport device, drone 1
receiving container 2
control device 3
starting point 4
gripper arm 5
shipment 6
addressee 7
server device 8
GPS receiver 9
destination area 10
locating signal 11
receiver device 12
authorisation information 13
transfer device 14

The invention claimed is:

1. A method for delivering a shipment by an unmanned transport device to a receiving container for said shipment, the method comprising the following steps:
    moving the unmanned transport device into a destination area associated with the receiving container, on the basis of geographical co-ordinates;
    once the unmanned transport device has reached the destination area, pairing of the transport device with the receiving container,
    exchanging an electronic authorisation information between the receiving container and the unmanned transport device,
    checking of the authorisation information by the receiving container in respect of an authorisation,
    if the authorisation exists, activating a transfer device for the shipment by the receiving container, and
    transferring the shipment from the unmanned transport device to the transfer device and/or from the transfer device to the unmanned transport device by the unmanned transport device, by the transfer device and/or by the receiving container.

2. The method according to claim 1, the method comprising the following step
    moving the unmanned transport device away from the receiving container, and/or
    deactivating the transfer device.

3. The method according to claim 1, wherein the step of pairing of the transport device with the receiving container comprises a detection of a locating signal emitted by the receiving container by the unmanned transport device, the method also comprising the step of the unmanned transport device approaching the receiving container on the basis of the locating signal.

4. The method according to claim 1, the method comprising the following step
    informing the receiving container that the unmanned transport device has moved into the destination area, and
    in response to the information, pairing the transport device with the receiving container.

5. The method according to claim 1, wherein the transfer device is self-mobile.

6. The method according to claim 3, wherein the step of the unmanned transport device approaching the receiving container comprises a position-specific docking of the unmanned transport device on the receiving container.

7. The method according to claim 1, wherein the electronic authorisation information is selected from the group consisting of WLAN, GSM, NFC, RFID and an electronic radio signal.

8. The method according to claim 1, wherein the exchange of the electronic authorisation information comprises an emission of the electronic authorisation information by the unmanned transport device to the receiving container.

9. The method according to claim 1, wherein the authorisation information is stored on a portable electronic device on the unmanned transport device, in particular on an RFID or NFC tag.

10. The method according to claim 1, wherein the authorisation information has a limited period of validity and/or becomes invalid after a predefined number of uses for proof of authorisation.

11. The method according to claim 1, wherein the provision of the transfer device comprises an opening of an opening in a roof or a side wall of the receiving container in order to place and/or collect a shipment in/from the receiving container and/or comprises an extension and/or deployment of a docking device for the unmanned transport device.

12. The method according to claim 1, wherein the transfer of the shipment comprises a lowering of the shipment from the unmanned transport device and/or a lifting of the transfer device and/or of the shipment by the receiving container and/or by the transfer device.

13. The method according to claim 1, the method comprising the following step
    gripping, hooking and/or suctioning of the shipment by the unmanned transport device and/or the receiving container in order to transfer the shipment.

14. The method according to claim 1, the method comprising the following step
    detecting, documenting, photographing, filming and/or scanning the transfer of the shipment between the unmanned transport device and the receiving container and/or detecting, documenting, photographing, filming and/or scanning the shipment as the shipment is transferred.

15. The method according to claim 1, the method comprising the following step
    electronically transmitting a message to the receiving container informing that the unmanned transport device is moving towards the receiving container, and/or electronically transmitting a transfer message once the shipment has been transferred by the receiving container.

16. The method according to claim 13, wherein the locating signal is embodied as a beam, by an instrument landing system and/or as a horizontal and vertical guide signal.

17. The method according to claim 1, the method comprising the following step
    charging of a rechargeable battery of the unmanned transport device by the receiving container and/or the transfer device.

18. An unmanned transport device, designed to carry out a method according to claim 1 and embodied as a flying machine selected from the group consisting of an aircraft, a UAV, a drone, a parcelcopter, a helicopter, a multicopter, a quadcopter, a aircraft, a vehicle, and a floating object.

19. A receiving container, designed for carrying out a method according to claim 1 and embodied as a letterbox, parcel box, letter and parcel box and/or as a parcel drop-off and pickup station for receiving the shipment.

* * * * *

UNITED STATES PATENT AND TRADEMARK OFFICE
CERTIFICATE OF CORRECTION

| | |
|---|---|
| PATENT NO. | : 9,811,796 B2 |
| APPLICATION NO. | : 15/303352 |
| DATED | : November 7, 2017 |
| INVENTOR(S) | : Thomas Ogilvie |

It is certified that error appears in the above-identified patent and that said Letters Patent is hereby corrected as shown below:

In the Claims

Column 20, Line 19, please insert the word --tiltwing-- before the word "aircraft."

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*